United States Patent
Clifford et al.

(10) Patent No.: US 8,713,300 B2
(45) Date of Patent: Apr. 29, 2014

(54) SYSTEM AND METHOD FOR NETBACKUP DATA DECRYPTION IN A HIGH LATENCY LOW BANDWIDTH ENVIRONMENT

(75) Inventors: Thomas G. Clifford, Edina, MN (US); Jeremy D. Swift, Plymouth, MN (US)

(73) Assignee: Symantec Corporation, Mountain View, CA (US)

( * ) Notice: Subject to any disclaimer, the term of this patent is extended or adjusted under 35 U.S.C. 154(b) by 231 days.

(21) Appl. No.: 13/011,588

(22) Filed: Jan. 21, 2011

(65) Prior Publication Data

US 2012/0191969 A1  Jul. 26, 2012

(51) Int. Cl.
*H04L 29/06* (2006.01)

(52) U.S. Cl.
USPC .................................................... 713/150

(58) Field of Classification Search
CPC ......... H04L 63/0428; H04L 9/00; H04L 9/08; H04L 29/06; H04L 2209/60; H04L 9/28; H04L 9/0618; H04L 63/08; H04L 63/00; H04L 63/20; G06F 21/00; G06F 21/602; G06F 21/6209; G06F 2221/2107; G06F 21/805
See application file for complete search history.

(56) References Cited

U.S. PATENT DOCUMENTS

| | | | |
|---|---|---|---|
| 5,668,810 A | 9/1997 | Cannella, Jr. |
| 5,727,159 A | 3/1998 | Kikinis |
| 5,848,070 A | 12/1998 | Durvaux et al. |
| 5,848,352 A | 12/1998 | Dougherty et al. |
| 5,987,518 A | 11/1999 | Gotwald |
| 6,192,082 B1 | 2/2001 | Moriarty et al. |
| 6,263,437 B1 | 7/2001 | Liao et al. |
| 6,397,259 B1 | 5/2002 | Lincke et al. |
| 6,659,860 B1 | 12/2003 | Yamamoto et al. |

(Continued)

FOREIGN PATENT DOCUMENTS

| | | |
|---|---|---|
| WO | PCT/US99/21983 | 9/1999 |
| WO | WO 01/06784 | 1/2001 |
| WO | 2007118829 | 10/2007 |

OTHER PUBLICATIONS

"Analysis of the Statistical Cipher Feedback Mode of Block Ciphers"; Heys, Howard M.; IEEE Transactions on Computers; vol. 52, No. 1, Jan. 2003; pp. 77-92.

(Continued)

*Primary Examiner* — Jason K. Gee
*Assistant Examiner* — Christopher C Harris
(74) *Attorney, Agent, or Firm* — Rory D. Rankin; Meyertons, Hood, Kivlin, Kowert & Goetzel, P.C.

(57) ABSTRACT

A system and method for efficient transfer of encrypted data over a low-bandwidth network. A backup server and a client computer are coupled to one another via a first network. The backup server is coupled to a remote data storage via another network, such as the Internet, also referred to as a cloud. The backup server encrypts received data for backup from the client computer. Cryptography segment and sub-segment sizes may be chosen that are aligned on a byte boundary with one another and with selected backup segment and sub-segment sizes used by backup software on the remote data storage. A selected cryptography algorithm has a property of allowing a given protected sub-segment with the cryptography sub-segment size to be decrypted by initially decrypting an immediate prior protected sub-segment that has the same cryptography sub-segment size. Therefore, the size of data transmitted via the cloud may be smaller than the cryptography segment size.

15 Claims, 8 Drawing Sheets

(56) References Cited

U.S. PATENT DOCUMENTS

| | | | |
|---|---|---|---|
| 7,526,085 B1 * | 4/2009 | Bong | 380/37 |
| 2003/0115447 A1 * | 6/2003 | Pham et al. | 713/153 |
| 2004/0153642 A1 | 8/2004 | Plotkin et al. | |
| 2009/0125726 A1 * | 5/2009 | Iyer et al. | 713/189 |
| 2009/0257583 A1 * | 10/2009 | Schneider | 380/37 |
| 2010/0174740 A1 * | 7/2010 | Ge | 709/217 |
| 2010/0274772 A1 | 10/2010 | Samuels | |

OTHER PUBLICATIONS

International Search Report in Application No. 12150971.5 dated May 8, 2012.

* cited by examiner

SYSTEM AND METHOD FOR NETBACKUP DATA DECRYPTION IN A HIGH LATENCY LOW BANDWIDTH ENVIRONMENT

BACKGROUND OF THE INVENTION

1. Field of the Invention

This invention relates to the field of computer networks and, more particularly, to efficient transfer of encrypted data over a low-bandwidth network.

2. Description of the Related Art

As computer memory storage and data bandwidth increase, so does the amount and complexity of data that businesses daily manage. A large portion of the data may include electronic documents, announcements, tasks, discussion topics, and so forth. Depending on the business value of this information, access to certain information may be secure and private. The contents of information servers and end-user systems may be backed up to a backup storage to prevent loss of data, especially for data identified as crucial data. In such a case, the dedicated server and storage subsystem may include a backup system. A backup system attempts to reduce the amount of data and time to backup data to protect a machine.

For an information technology (IT) administrator to centralize management of the corporate information and the computing support for employees and customers, an IT administrator may utilize a datacenter. A datacenter is a centralized repository, either physical or virtual, for the storage, management, protection and dissemination of this corporate information. A datacenter may also be referred to as a server room or a server farm. However, there may be times when an IT administrator chooses to avoid capital expenditure and leases one or more server computer systems on a short-term or long-term basis. The business may consume resources at a third-party remote location as a service and pay only for resources actually consumed. Examples include educational classroom services, demonstration of software to potential users or buyers, website server applications, data protection, and so forth.

The type of computing described above may be referred to as cloud computing, wherein dynamically scalable and often virtualized resources at a third-party remote location is provisioned for use over a network, such as the Internet. Cloud computing provides on-demand procurement, lowered financial cost and application mobility. For example, application software and corresponding data may be stored at the remote location, but the application may be accessible from a web browser. A cloud computing implementation of a software application allows a business to access the application through the Internet without knowledge of or control over the infrastructure supporting the application. The primary considerations for remote access include the remote access software and the network interface.

An IT administrator may develop a management system for data backup and data protection; data recovery, restore, and restart; archiving and long-term retention; and day-to-day processes and procedures necessary to manage a storage architecture. This management system may apply certain policies to the effective management of information. The management system may support a cloud plug-in to enable writing backup data streams to the remote data storage location within the cloud computing system. These data streams are generally very large in order to minimize the catalog and tracking burden. In addition, these data streams are typically encrypted for protection. High latency and low bandwidth properties are typical characteristics of a cloud computing system, which includes a wide area network (WAN). In such an environment, data transfers for both backup and recovery operations may be slow and reduce the benefits of utilizing a cloud computing solution.

In view of the above, improved systems and methods for efficient transfer of encrypted data over a low-bandwidth network are desired.

SUMMARY OF THE INVENTION

Systems and methods for efficient transfer of encrypted data over a low-bandwidth network.

In one embodiment, a computing system comprises a backup server and a client computer coupled to one another via a network, such as a local area network (LAN). The backup server is coupled to remote data storage via another network, such as the Internet. This other network may be referred to as a cloud. The remote data storage may comprise an archive store. When the client computer sends a backup request for selected data to the backup server, the backup server encrypts the received data from the client computer. Cryptography segment and sub-segment sizes may be chosen that are aligned on a byte boundary with one another and with selected backup segment and sub-segment sizes. Therefore, a beginning of each of the segments is aligned with the other segment. The backup segment and sub-segment sizes may be used for transmission of data between the backup server and the remote data storage via the cloud in addition to being used by software on the remote backup storage. A selected cryptography algorithm may have a property of allowing a given encrypted sub-segment with the cryptography sub-segment size to be decrypted by utilizing an immediate prior encrypted sub-segment that has the same cryptography sub-segment size. For example, a given 128 kilo-byte (KB) cryptography segment may comprise 4,096 32-byte cryptography sub-segments. A given 32-byte cryptography sub-segment with an offset index of 7 may be decrypted by utilizing a second 32-byte cryptography sub-segment with a prior offset index of 6, or the 32-byte cryptography sub-segment immediately prior to the given 32-byte cryptography sub-segment. This prior 32-byte cryptography sub-segment, which is encrypted itself, may be used as a key to decrypt the given 32-byte cryptography sub-segment. Therefore, the entire 128 KB cryptography segment is not used for decrypting the given 32-byte cryptography sub-segment.

After the encrypted data is sent to the remote data storage via the cloud, at a later time, the client computer may request to restore backed up data. If a portion of the requested data is smaller than the size of a cryptography segment, such as a 128 KB cryptography segment, then the remote data storage may send smaller sized blocks via the cloud. For example, one or more blocks with a size of a backup sub-segment, such as a 1 KB size, may be sent. The backup server may decrypt one or more encrypted sub-segments, such as the 32-byte sub-segments, within each of the backup sub-segments, such as the 1 KB sub-segments. Then the decrypted data may be conveyed to the client computer.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
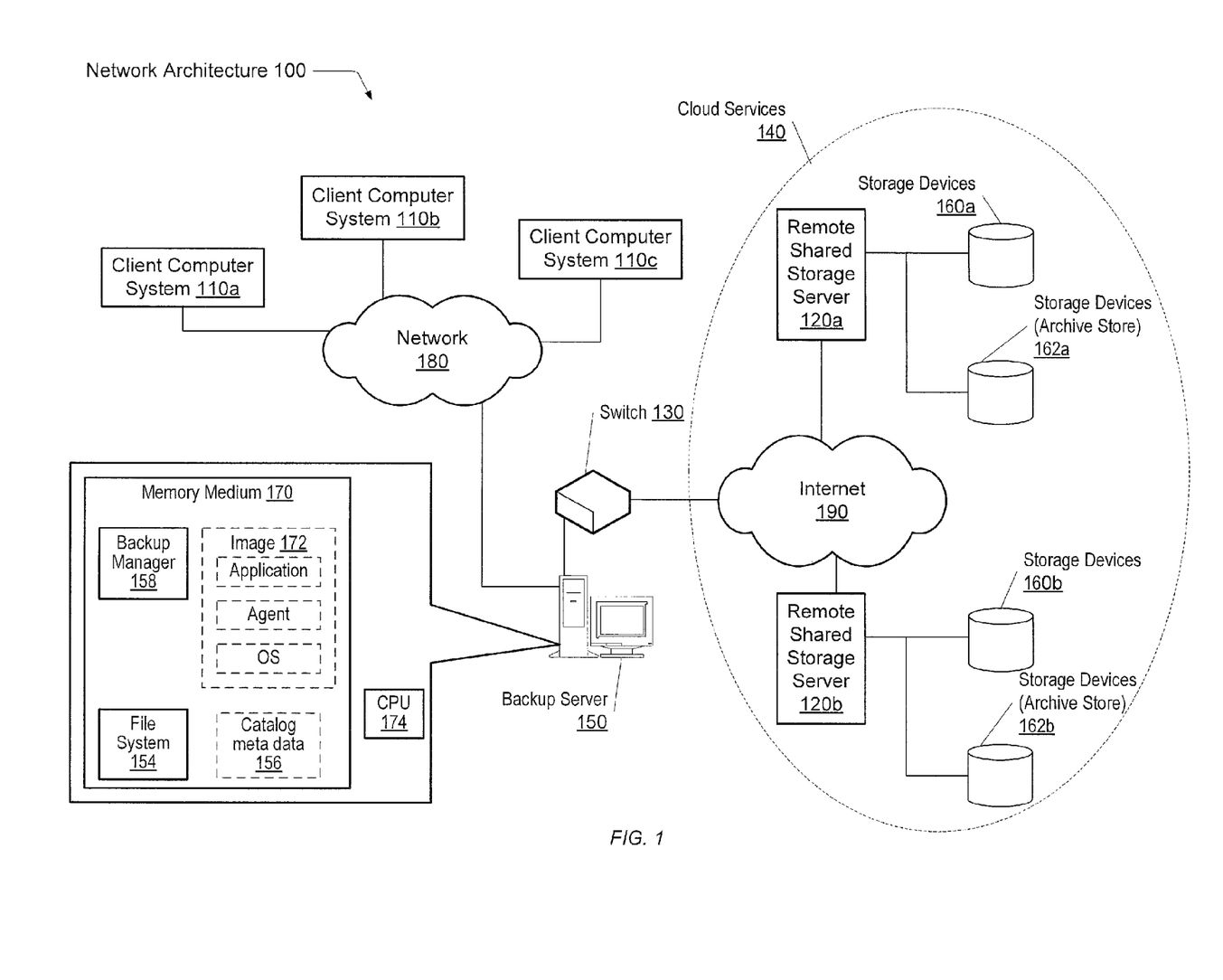
FIG. 1 is a generalized block diagram illustrating one embodiment of a network architecture.

Various embodiments of a system and a method for efficient transfer of encrypted data over a low-bandwidth network are described herein. Referring to FIG. 1, a generalized block diagram illustrating one embodiment of a network architecture 100 including a capability for efficiently transferring encrypted data over a low-bandwidth network is shown. As shown, the network architecture 100 includes client computing systems 110a-110c interconnected through a local area network 180 to one another and to a backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 180.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware.

The backup server 150 may be coupled to a second network 190 through a switch 130. The network 190 may be the Internet or other outside network. Alternatively, network 180 may be coupled to network 190 via one or more switches. Switch 130 may utilize a protocol associated with both networks 180 and 190. The network 180 and the backup server 150 may interface with a set of communications protocols used for the Internet such as the Transmission Control Protocol (TCP) and the Internet Protocol (IP), or TCP/IP. Switch 130 may be a TCP/IP switch.

Storage devices 160a-160b may be used to store copies of data within the network architecture 100. Storage devices 160a-160b may include or be further coupled to several varieties of storage consisting of one or more hard disks, tape drives, server blades, Solid-State Disks (SSDs), or specialized devices, and may include a variety of memory devices such as RAM, Flash RAM, MEMS (Micro Electro Mechanical Systems) storage, battery-backed RAM, and/or non-volatile RAM (NVRAM), etc. Storage devices 162a-162b may be used to store copies of data stored on devices 160a-160b. Storage devices 162a-162b may comprise one or more of the memory devices listed for storage devices 160a-160b.

In one embodiment, the remote shared storage servers 120a-120b in network architecture 100 may create a copy of files on client computing systems 110a-110c to protect data. In addition, a backup agent on client computing systems 110a-110b and/or backup server 150 may determine when data objects qualify to be archived. The servers 120a-120b within cloud services 140 may be off-site servers accessed via the Internet network 190. The remote shared storage servers 120a-120b may provide software and data to client computing systems 110a-110c on demand. Users of the client computing systems 110a-110c may have no knowledge of or control over the technology infrastructure within the cloud services 140. This may be referred to as cloud computing. In one embodiment, cloud computing is Internet-based computing. Simple examples include e-mail accounts with a Web-based e-mail service like Hotmail, Yahoo! Mail or Gmail. The software and storage for the e-mail accounts don't exist on the client computing systems 110a-110c, but exist within the client services 140. By not owning a physical infrastructure, such as an on-site datacenter, cloud-computing customers avoid capital expenditure by renting usage from a third-party provider.

A web service is typically an application programming interface (API) or Web API that is accessed via Hypertext Transfer Protocol (HTTP) and executed on a remote system, such as servers 120*a*-120*b* and backup server 150, hosting the requested service. A web service supports interoperable machine-to-machine interaction over a network. It has an interface described in a machine-process format, such as Web Services Description Language (WSDL). Cloud architecture typically includes multiple cloud components communicating with each other over application programming interfaces such as web services.

Returning now to the backup server 150, the backup server 150 may include a backup application 158. This backup application 158, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations. Policies for backup and duplication operations within a lifecycle may be determined for data images. For example, the policies may include determining a number of tiers in a tiered storage, a type and a number of storage media, a time duration for an image to be stored on a given storage medium, the hours of the day to block from particular operations, and so forth.

A backup system agent may assist the backup manager 158 on backup server 150. The backup manager 158 may be configured to create a volume image backup. In some embodiments, the backup manager 158 may receive user input directing the backup manager 158 to create a volume image backup of a specific system. In some embodiments, the backup manager 158 may create a volume image backup of a specific system automatically, e.g., the backup manager may be scheduled to perform regular backups of a specific system. As part of creating backups, the backup manager 158 may also create catalog metadata 156 associated with the backup data.

The catalog metadata 156 created by the backup manager 158 during a backup operation may include at least one or more of the following: a data name, data size, a fingerprint of the data, a batch number, as well as data type, version number, ownership, permissions, modification time, backup segment and sub-segment identifiers, cryptography segment and sub-segment identifiers, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage devices 160*a*-160*b* and archive stores 162*a*-162*b* may be stored in the catalog 156.

In one embodiment, the backup server 150 comprises a file system 154 that operates as a special-purpose database for the storage, organization, manipulation, and retrieval of data. File system 154 may provide access to data by operating as clients for a network protocol. Alternatively, file system 154 may be virtual and exist only as an access method for virtual data.

It is noted that in alternative embodiments, the number and type of client computers and servers, switches, networks and shared storage is not limited to those shown in FIG. 1. At various times one or more clients may operate offline. In addition, during operation, individual client computer connection types may change as users connect, disconnect, and reconnect to network architecture 100.

Figure 2:
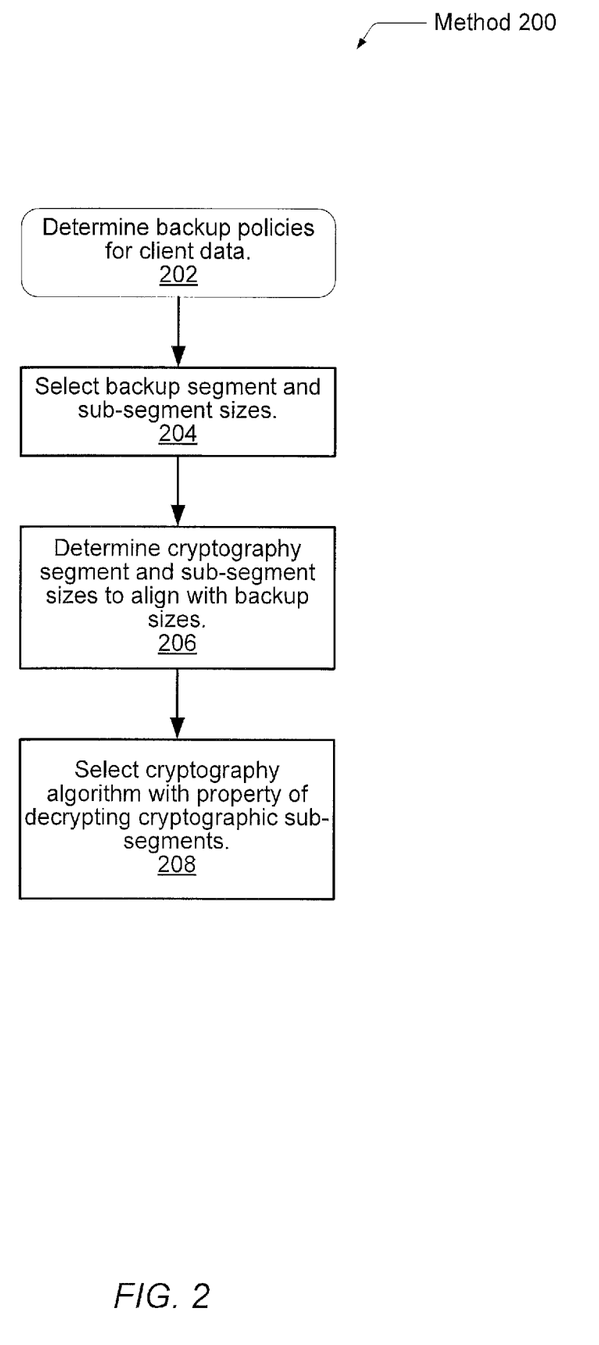
FIG. 2 is a generalized flow diagram illustrating one embodiment of a method for efficient backup operations.

Turning now to FIG. 2, a generalized flow diagram illustrating one embodiment of a method 200 for efficient backup operations is shown. The components embodied in network architecture 100 may generally operate in accordance with method 200. It is noted for purposes of discussion, the steps in this embodiment of method 200 are described in sequential order. However, some steps may occur in a different order than shown, some steps may be performed concurrently, some steps may be combined with other steps, and some steps may be absent in another embodiment.

In block 202, policies for backup and duplication operations are determined for data on client computing systems 110*a*-110*c*. As described earlier, policies may include determining a number of tiers in a tiered storage, a type and a number of storage media, a time duration for an image to be stored on a given storage medium, the hours of the day to block from particular operations, the hours of the day to perform backup and duplication operations according to a schedule, and so forth.

In block 204, the backup segment and sub-segment sizes are selected. These sizes may determine the amount of data transferred between the backup server 150 and the cloud services 140. The ability to write very large backup segments to the cloud services 140 may reduce metadata overhead support. In one embodiment, the backup segment size may range from 1 KB to 256 KB. The backup sub-segment size may be selected based on expected data sizes corresponding to restore requests. One of the client computing systems 110*a*-110*c* may send a restore request to the backup server 150. The backup server 150 sends a corresponding request to the cloud services 140 for the requested data. The requested data is conveyed from the cloud services 140 to the backup server. In one embodiment, the backup sub-segment size may be the same size as the backup segment size. However, data sizes corresponding to restore requests may be typically smaller than the amount of data backed up or archived. In another embodiment, the backup sub-segment size may range from 1 KB to 128 KB when the backup segment size is 256 KB.

Cryptography may be used to protect data being transferred between the backup server 150 and the cloud services 140. Cryptography may be used to prevent data from being viewed or modified and to provide secure communication over otherwise insecure channels. For example, cryptography may protect a user's identity, prevent data from being altered, and assure data originates from a particular party. Data may be encrypted using a selected cryptographic algorithm. The data may be transmitted in an encrypted state, and later decrypted by an intended receiver. If a third party intercepts the encrypted data, it may be difficult to decipher.

Cryptography may use symmetric encryption or asymmetric encryption. With symmetric encryption, a secret key, which may be a number, a word, or a string of random letters, is applied to the text of a message to change the content in a particular way. With asymmetric encryption, a key pair is used to protect data. A public key may be made freely available for sending data. Messages, such as text, binary files, documents, and so forth, encrypted with a public key may be decrypted by applying a same selected cryptographic algorithm, but with a matching private key. Similarly, messages that are encrypted with the private key may be decrypted with the same algorithm and use of the public key.

In order to minimize an amount of cryptographic metadata to maintain, data may not be padded during encryption. The size of the data and the size of the resulting cryptography segment do not increase due to padding. In addition, when selecting a cryptographic algorithm, selection criteria may include a property of allowing a given protected sub-segment with the cryptography sub-segment size to be decrypted by utilizing an immediate prior encrypted sub-segment that has the same cryptography sub-segment size. For example, a given 128 KB cryptography segment may comprise 4,096 32-byte cryptography sub-segments. A given 32-byte cryptography sub-segment with an offset index of 7 may be decrypted by utilizing a prior second 32-byte cryptography sub-segment with a prior offset index of 6. This prior 32-byte cryptography sub-segment, which is encrypted itself, may be used as a key to decrypt the given 32-byte cryptography sub-segment. Therefore, the entire 128 KB cryptography segment is not used for decrypting the given 32-byte cryptography sub-segment with the index of 7. In one embodiment, the cryptographic algorithm named AES-256-CFB may be selected. This algorithm uses an Advanced Encryption Standard (AES) symmetric-key encryption standard, a cryptography segment size of 256 KB, and a cipher feedback mode feature.

Returning to method 200, in block 206, the cryptography segment and sub-segment sizes are determined so that the size values align with the backup segment and sub-segment sizes. For example, a 32-byte cryptography sub-segment size may be selected. In addition, a 256 KB cryptography segment size may be selected. These sizes align with one another on a byte boundary. Further, for backup segment and sub-segment sizes of 256 KB and 1 KB, the cryptography sizes also are in alignment. In addition, a beginning of each of the segments is aligned with the other segment. A beginning of the cryptography segment aligns with a beginning of the backup segment. In another embodiment, the cryptography sizes and the backup sizes may not align. In such a case, further calculations may be performed when encrypting, decrypting and transferring data to and from the cloud services 140 in order to access corresponding data. The further calculations may determine how many segments and sub-segments of each type will be used during a respective operation. In block 208, a cryptography algorithm with a property of decrypting at a level of cryptographic sub-segments may be selected. An example of such a cryptography algorithm is the AES-256-CFB described above.

Figure 3:
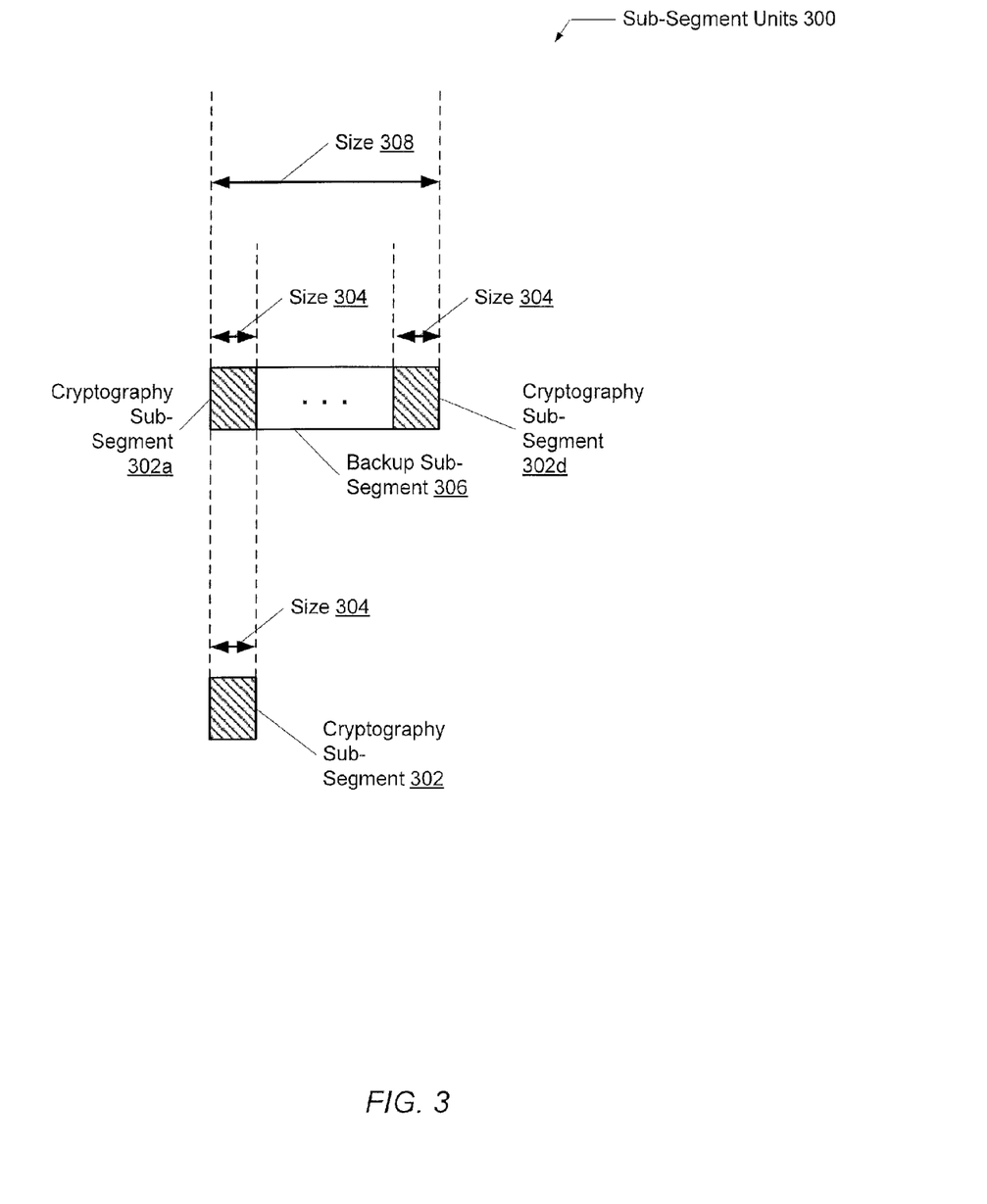
FIG. 3 is a generalized block diagram illustrating one embodiment of sub-segment units including a cryptography sub-segment and a backup sub-segment.

Referring now to FIG. 3, a generalized block diagram illustrating one embodiment of sub-segment units 300 including a cryptography sub-segment 302 and a backup sub-segment 306 is shown. As shown, the cryptography sub-segment 302 has a size 304. In one embodiment, the sub-segment size 304 is 32 bytes. In one embodiment, the backup sub-segment 306 comprises an integer multiple of cryptography sub-segments 302a-302d. Therefore the backup sub-segment size 308 is an integer multiple of the size 304. In one embodiment, the backup sub-segment size 308 is 1 KB. In the example shown, the cryptography sub-segment 302 and the backup sub-segment 306 are byte aligned. Again, in another embodiment, the backup sub-segment size 308 may not be an integer multiple of the size 304. In such a case, further calculations may be performed when encrypting, decrypting and transferring data to and from the cloud services 140 to determine a number of backup sub-segments 306 and a number of cryptography sub-segments 302 to use during a respective operation.

Figure 4:
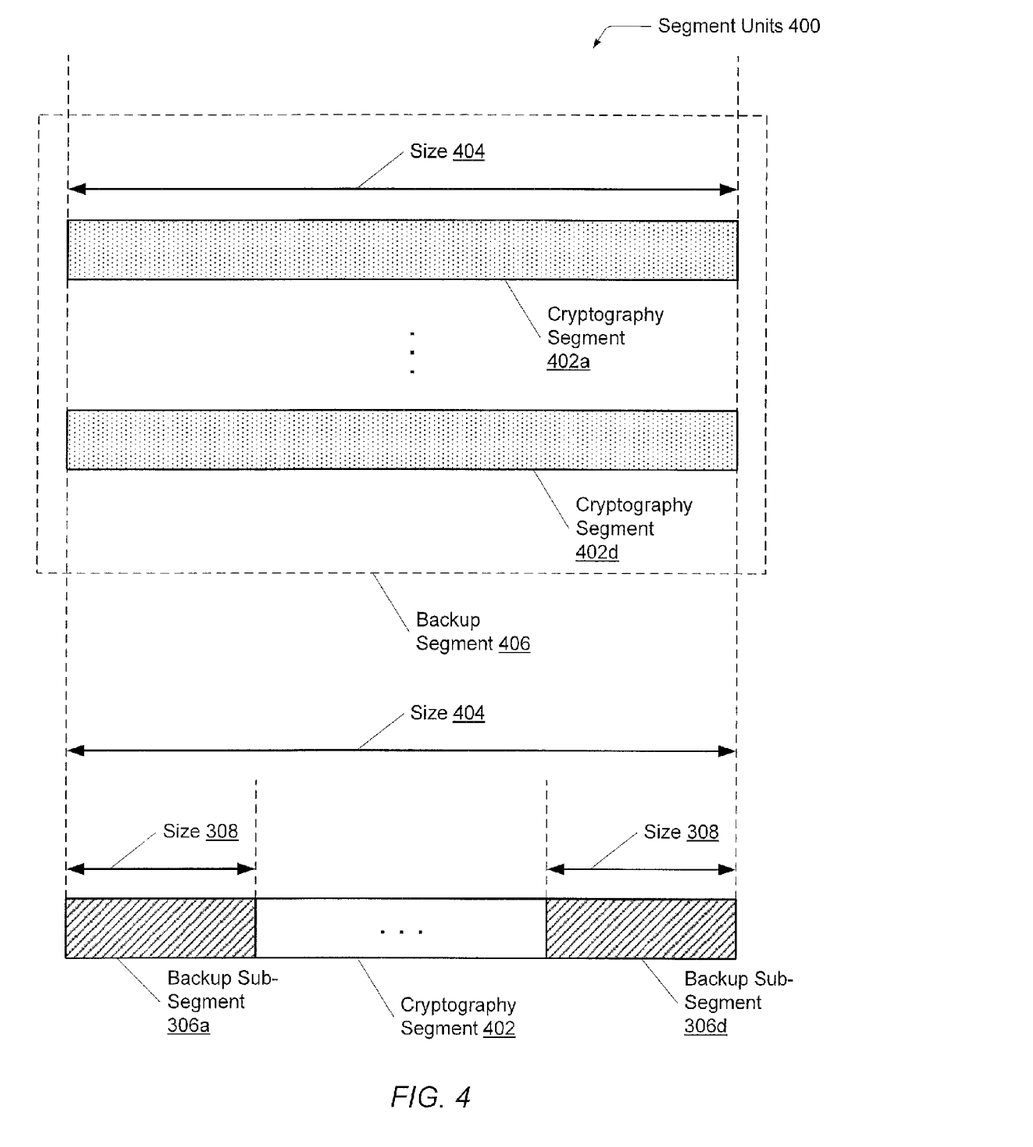
FIG. 4 is a generalized block diagram illustrating one embodiment of segment units including a cryptography segment and a backup segment.

Referring now to FIG. 4, a generalized block diagram illustrating one embodiment of segment units 400 including a cryptography segment 402 and a backup segment 406 is shown. As shown, the cryptography segment 402 has a size 404. In one embodiment, the cryptography segment size 404 is 128 KB. In one embodiment, the cryptography segment 406 comprises one or more backup sub-segments 306a-306d. As previously shown, each backup sub-segment may comprise one or more cryptography sub-segments 302a-302d. Accordingly, each cryptography segment 406 comprises one or more cryptography sub-segments 302. Therefore, the cryptography segment 406, the backup sub-segment 306 and the cryptography sub-segment may be byte aligned. The cryptography segment size may be the smallest units size used for encryption. The cryptography sub-segment size may be the smallest unit size used for decryption.

In one embodiment, the backup segment 406 comprises one or more cryptography segments 402a-402d. Therefore the backup segment size is an integer multiple of the size 404. In one embodiment, the backup segment size is 256 KB. In such a case, the backup segment size is twice the amount of the cryptography segment size 404 of 128 KB. In some embodiments, the backup segment size and the cryptography segment size are equal. For example, each of these sizes may be 256 KB. In the examples shown, the backup segment 406 and the cryptography segment 402 are byte aligned. Further, the backup sub-segment 306 and the cryptography sub-segment 302 are byte aligned with one another and with each of the segments 402 and 406. Again, in another embodiment, the backup segment size may not be an integer multiple of the cryptography segment size 404. Further the sub-segment sizes may not be byte aligned with one another or with the segment sizes. In such cases, further calculations may be performed when encrypting, decrypting and transferring data to and from the cloud services 140 to determine a number of segments and sub-segments to use during a respective operation.

Figure 5:
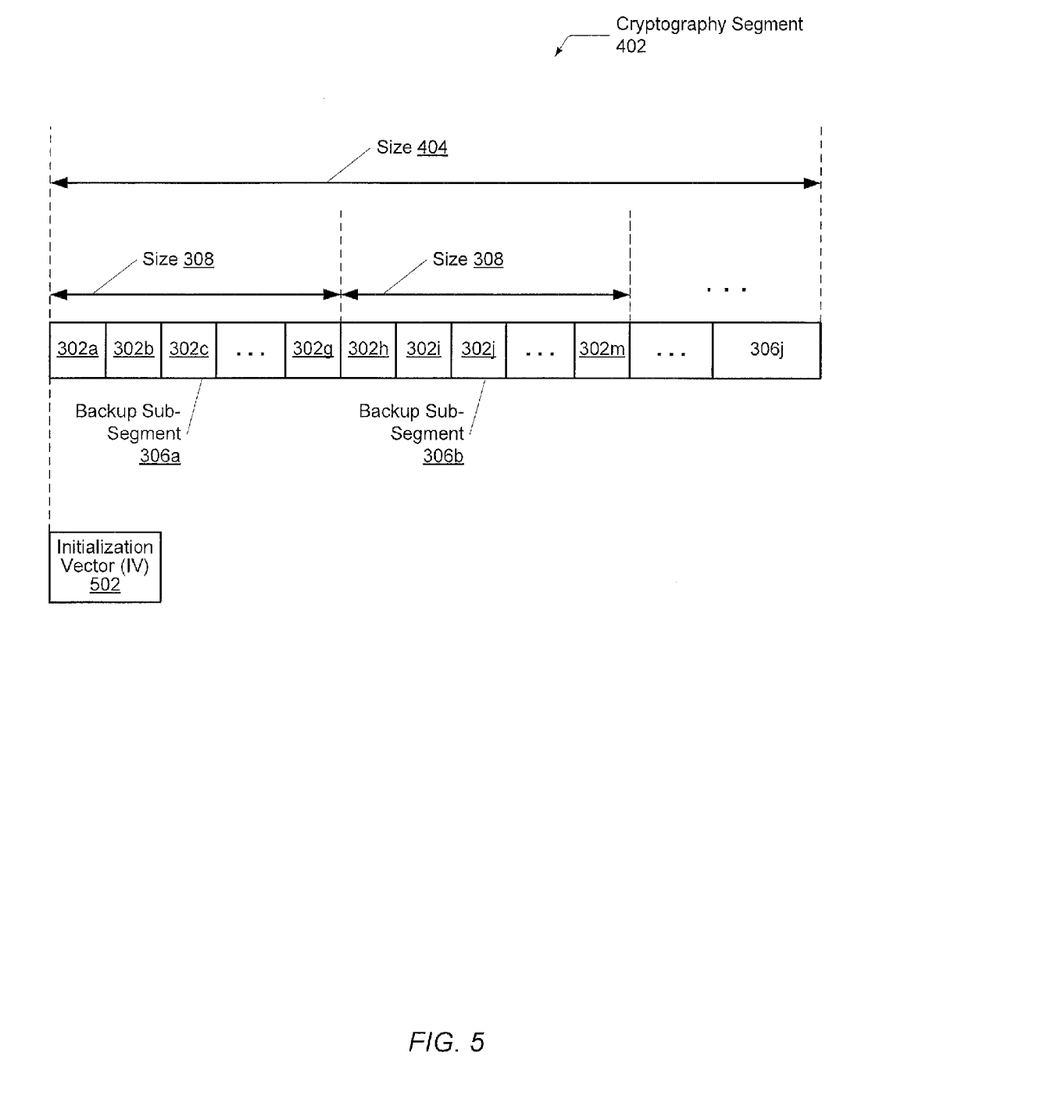
FIG. 5 is a generalized block diagram illustrating one embodiment of cryptography segment.

Referring now to FIG. 5, a generalized block diagram illustrating one embodiment of cryptography segment 402 is shown. The cryptography segment 402 may be byte aligned with a backup sub-segment 306 and a cryptography sub-segment 302. An initialization vector 502 may be used to encrypt data held in the cryptography segment 402. Each cryptography segment 402 may have its own vector 502. The initialization vector 502 may be a public or a private key depending on the selected cryptography algorithm. The vector 502 may be used to encrypt cryptography sub-segment 302a. Afterward, the encrypted sub-segment 302a may be used to encrypt sub-segment 302b. Following, the encrypted sub-segment 302b may be used to encrypt sub-segment 302c and so forth. In such a case, the encrypted sub-segment 302c may be decrypted using the encrypted sub-segment 302b with a same algorithm. Similarly, the encrypted sub-segment 302b may be decrypted with use of the encrypted sub-segment 302a. The encrypted sub-segment 302a is decrypted with use of the initialization vector 502.

Figure 6:
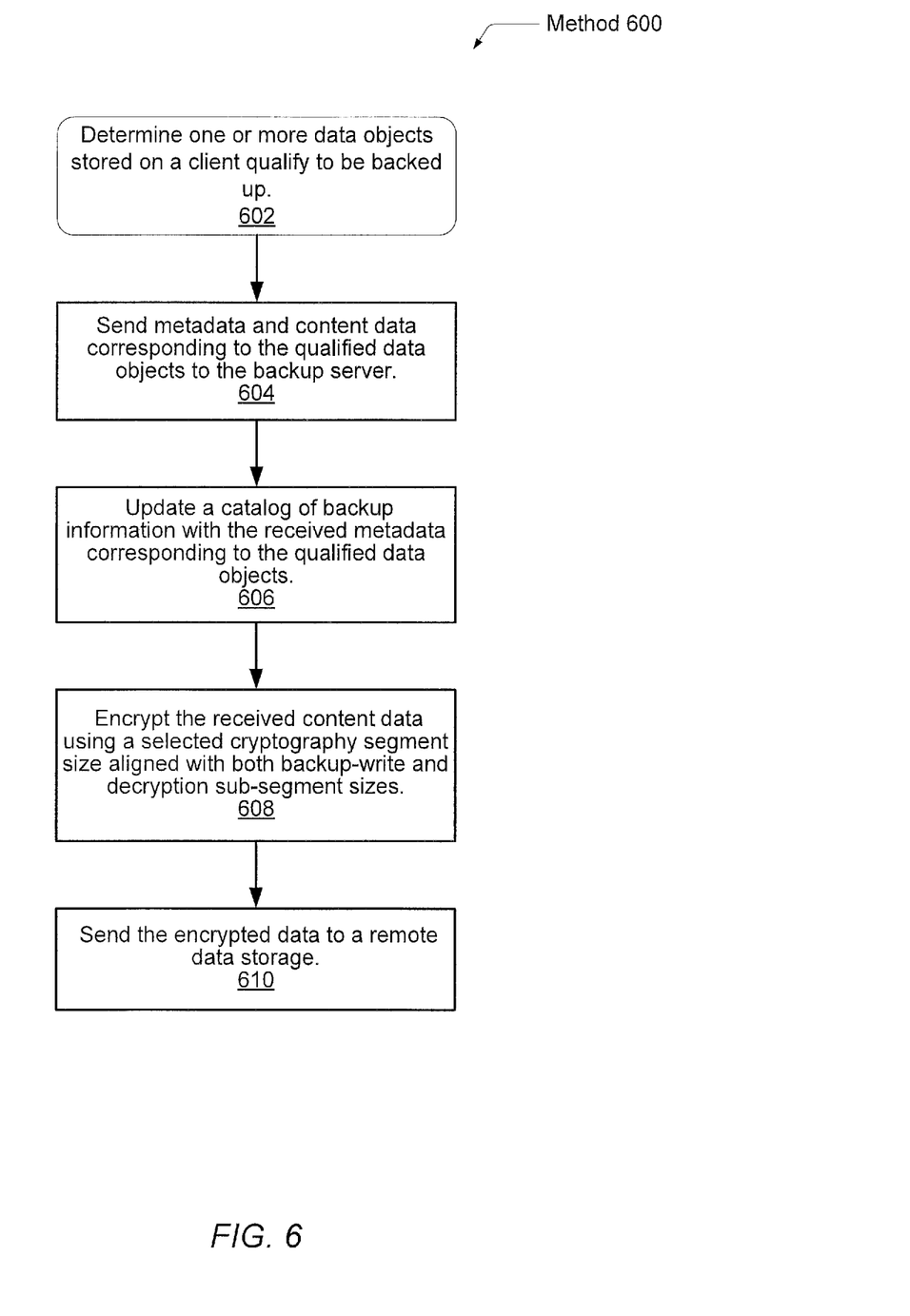
FIG. 6 is a generalized flow diagram illustrating one embodiment of a method for backing up data.

Turning now to FIG. 6, a generalized flow diagram illustrating one embodiment of a method 200 for backing up data is shown. The components embodied in network architecture 100 may generally operate in accordance with method 00. It is noted for purposes of discussion, the steps in this embodiment of method 200 are described in sequential order. However, some steps may occur in a different order than shown, some steps may be performed concurrently, some steps may be combined with other steps, and some steps may be absent in another embodiment.

In block 602, one or more data objects stored on one of the client computing systems 110a-110c are determined to qualify to be backed up. Backup policies, user input, or other may be used to make this determination. In block 604, in one embodiment, metadata and content data corresponding to the qualified data objects are sent to the backup server 150. In another embodiment, one or more of the client computing systems 110a-110c comprises software, such as a plug-in, to interface with the cloud services 140 directly.

In block 606, a catalog of backup information is updated with the received metadata corresponding to the qualified data objects. In block 608, the backup server 150 encrypts the received content data using a selected cryptography algorithm. In one embodiment, a cryptography segment size is byte aligned with backup-write and cryptography, or decryption, sub-segment sizes. In block 610, the encrypted data is sent to remote data storage, such as one of the remote shared storage servers 120a-120b within cloud services 140.

Figure 7:
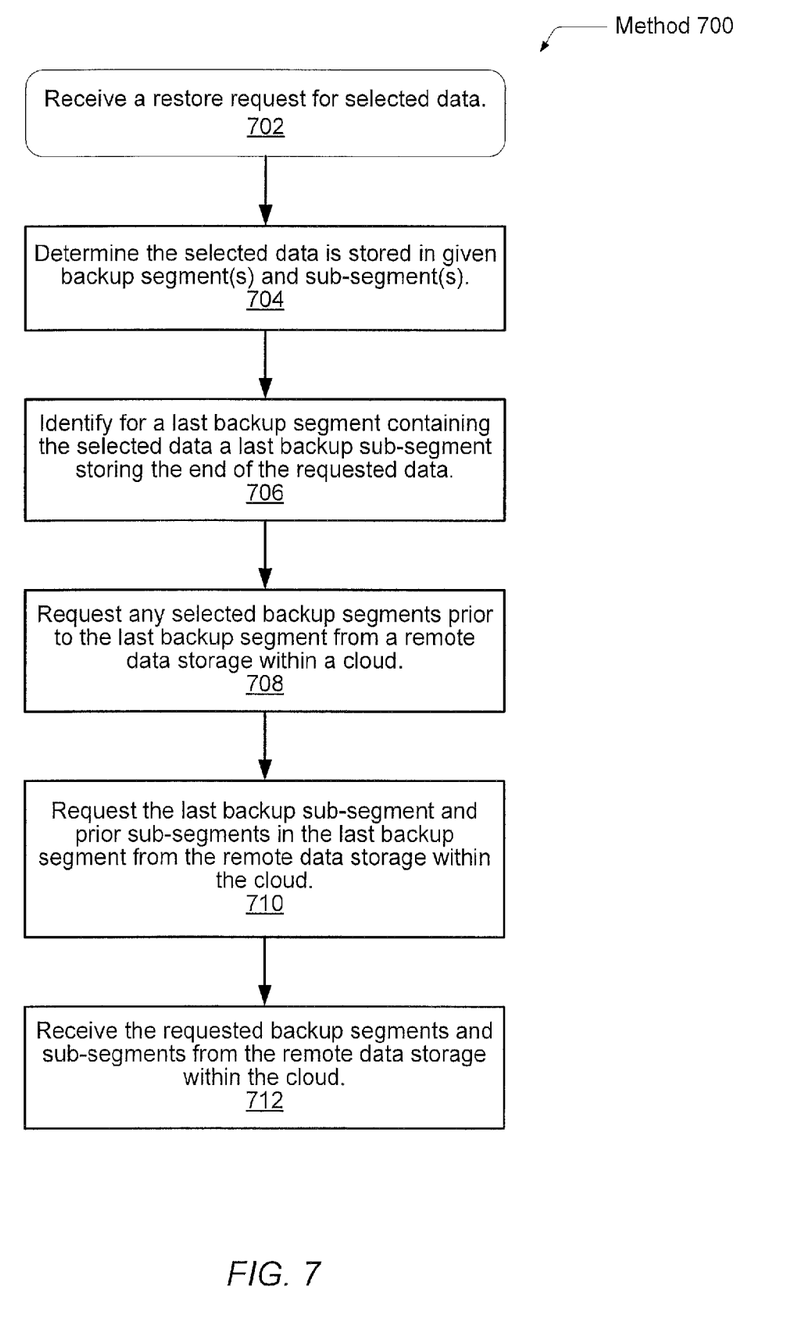
FIG. 7 is a generalized flow diagram illustrating one embodiment of a method for identifying and receiving restore data.

Turning now to FIG. 7, a generalized flow diagram illustrating one embodiment of a method 700 for identifying and receiving restore data is shown. In block 702, the backup server 150 may receive a restore request from one of the client computing systems 110a-110c. The restore request may identify selected data previously stored on the requesting one of the client computing systems 110a-110c. In block 704, the backup server 150 may inspect a catalog and determine the selected data is stored in given backup segment(s) and sub-segment(s) with unique identifiers. In block 706, the backup server 150 may identify for a last backup segment containing the selected data a last backup sub-segment storing the end of the requested data.

In block 708, the backup server 150 may send a request for any selected backup segments prior to the last backup segment to remote data storage within the cloud services 140. In block 710, within the same request or within a separate request, the backup server 150 may request the last backup sub-segment and prior sub-segments in the last backup segment from the remote data storage within the cloud services 140. Here, the backup server 150 may not request the entire last backup segment to obtain the requested restore data. For example, if the requested restore data includes backup sub-segments 0 to 4 within the last backup segment, then the backup server 150 may request those five backup sub-segments, rather than the entire backup segment. With segment and sub-segment sizes of 256 KB and 1 KB, respectively, the backup server 150 would request 5 KB, instead of 256 KB, to transmit over the Internet from the cloud services 140. In block 712, the backup server 150 receives the requested backup segments and sub-segments from the remote data storage within the cloud services 140.

Figure 8:
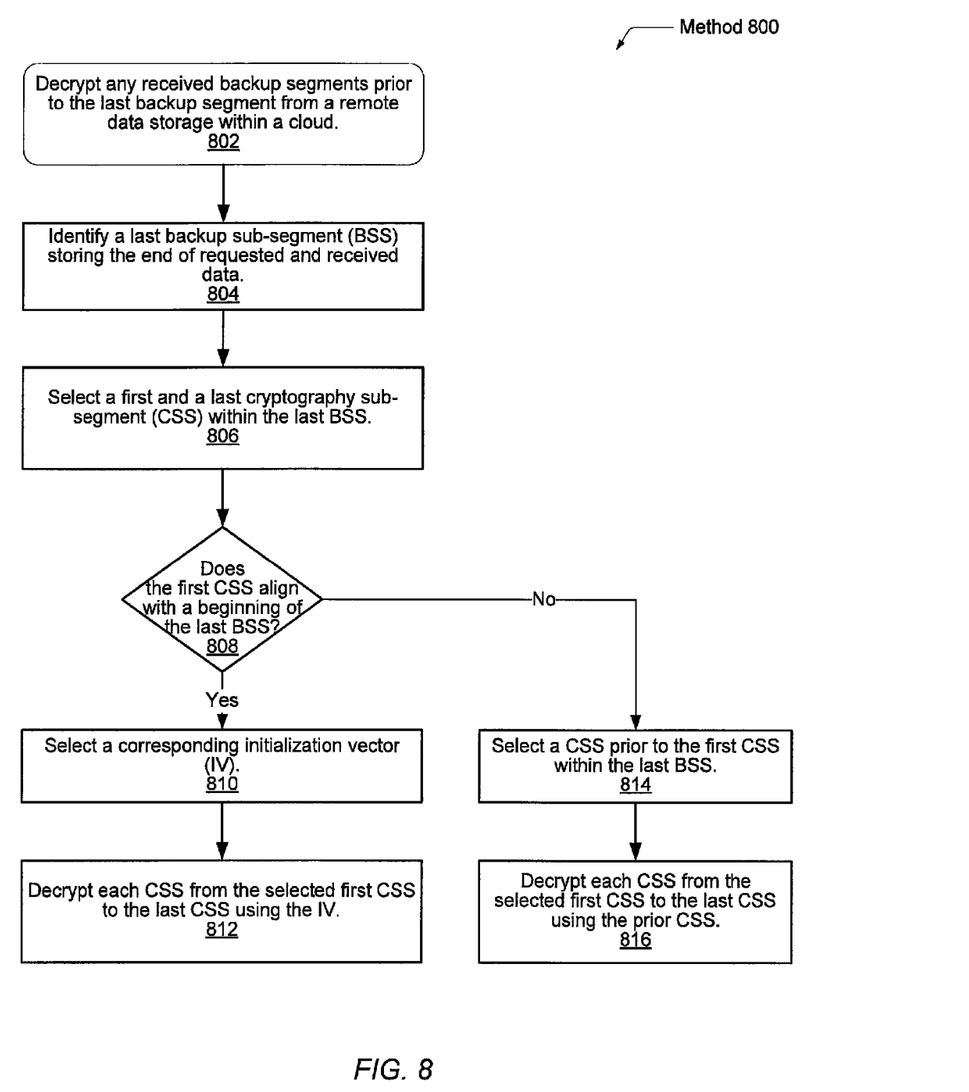
FIG. 8 is a generalized flow diagram illustrating one embodiment of a method for decrypting restored data received over a network.

Turning now to FIG. 8, a generalized flow diagram illustrating one embodiment of a method 200 for decrypting restored data received over a network is shown. Similar to methods 200 and 500-700, the components embodied in network architecture 100 may generally operate in accordance with method 800, and additionally, the steps in this embodiment of method 800 are described in sequential order. However, some steps may occur in a different order than shown, some steps may be performed concurrently, some steps may be combined with other steps, and some steps may be absent in another embodiment.

In block 802, the backup server 150 may decrypt any received backup segments prior to the last backup segment from remote data storage within the cloud services 140. For each backup segment, the decryption may utilize a same cryptography algorithm and a same respective initialization vector 502 used during encryption. In block 804, the backup server 150 may identify a last backup sub-segment storing the end of the requested and received data. In block 806, the backup server 150 may select a first and a last cryptography sub-segment within this last backup sub-segment corresponding to data requested to be restored.

If the selected first cryptography sub-segment aligns with a beginning of the last backup sub-segment (conditional block 808), then in block 810, the back up server 150 may select a corresponding initialization vector 502. For example, the selected first cryptography sub-segment from step 806 may be sub-segment 302a as shown in FIG. 5. In block 812, the backup server 150 may decrypt each sub-segment from the selected first sub-segment to the selected last sub-segment initially using the selected vector 502.

If the selected first cryptography sub-segment does not align with a beginning of the last backup sub-segment (conditional block 808), then in block 814, the backup server may select a cryptography sub-segment prior to the first selected cryptography sub-segment within the last backup sub-segment. For example, the selected first cryptography sub-segment from step 806 may be sub-segment 302c as shown in FIG. 5. Therefore, the backup server 150 may select cryptography sub-segment 302b for decrypting sub-segment 302c and then discard the extra bytes within the sub-segment 302b. In block 816, the backup server may decrypt each cryptography sub-segment from the selected first sub-segment to the selected last sub-segment initially using the prior cryptography sub-segment.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
   receiving, by a backup server computer, a backup request from a client computer for first data;
   in response to the backup request:
      encrypting, by the backup server computer, the first data as one or more encrypted segments, each having an encrypted segment size; and
      conveying, by the backup server computer, the one or more encrypted segments to a remote server computer for storage on a storage medium; and
   the method further comprising:
      receiving, by the backup server computer, a restore request from the client computer for second data which corresponds to a given encrypted segment of the first data, the second data having a size less than the encrypted segment size; and
      in response to the restore request:
         requesting, by the backup server computer, transmission from the remote server computer of only a portion of the given encrypted segment, wherein the given encrypted segment has a beginning and an end, wherein the requested portion does not include one or more encrypted sub-segments at the end of the given encrypted segment.

2. The method as recited in claim 1, further comprising:
   receiving, by the backup server computer, only the requested portion of the given encrypted segment; and
   decrypting, by the backup server computer, the requested portion of the given encrypted segment, wherein said decrypting comprises utilizing an encrypted sub-segment immediately prior to a particular encrypted sub-segment to decrypt the particular encrypted sub-segment.

3. The method as recited in claim 2, further comprising receiving, by the backup server computer, an initialization vector for the given encrypted segment, wherein said decrypting further comprises utilizing the initialization vector to decrypt an initial encrypted sub-segment at the beginning of the given encrypted segment, wherein the initialization vector was used to encrypt the initial encrypted sub-segment.

4. The method as recited in claim 2, wherein an algorithm used for encryption has a property of allowing a given encrypted sub-segment to be decrypted by utilizing an immediate prior encrypted sub-segment as a key.

5. The method as recited in claim 4, wherein the algorithm has a property of not padding data during encryption.

6. The method as recited in claim 1, wherein the backup server computer and the remote server computer are coupled via the Internet.

7. A computing system comprising:
   a backup server computer;
   a client computer coupled to the backup server computer via a first network; and
   a remote server computer coupled to the backup server computer via a second network;
   wherein the backup server computer is configured to:
      receive from the client computer a backup request to backup first data;
      in response to the backup request:
         encrypt the first data as one or more encrypted segments, each having an encrypted segment size; and
         convey the one or more encrypted segments to the remote server computer for storage on the storage medium;
      receive a restore request from the client computer for second data which corresponds to a given encrypted segment of the first data, the second data having a size less than the encrypted segment size;
      in response to the restore request:
         request the remote server computer to transmit only a portion of the given encrypted segment, wherein the given encrypted segment has a beginning and an end, wherein the requested portion does not include one or more encrypted sub-segments at the end of the given encrypted segment.

8. The computing system of claim 7, wherein the backup server computer is further configured to:
   receive only the requested portion of the given encrypted segment; and
   decrypt the requested portion of the given encrypted segment, wherein said decrypting comprises utilizing an encrypted sub-segment immediately prior to a particular encrypted sub-segment to decrypt the particular encrypted sub-segment.

9. The computing system of claim 8, wherein the backup server computer is further configured to:
   receive an initialization vector for the given encrypted segment, wherein said decrypting further comprises utilizing the initialization vector to decrypt an initial encrypted sub-segment at the beginning of the given encrypted segment, wherein the initialization vector was used to encrypt the initial encrypted sub-segment.

10. The computing system of claim 8, wherein an algorithm used for encryption has a property of allowing a given encrypted sub-segment to be decrypted by utilizing an immediate prior encrypted sub-segment as a key.

11. The computing system of claim 10, wherein the algorithm has a property of not padding data during encryption.

12. The computing system of claim 10, wherein the backup server computer and the remote server computer are coupled via the Internet.

13. A non-transitory computer-readable storage medium storing program instructions, wherein the program instructions are executable by a backup server computer to cause the backup server computer to:
   receive a backup request from a client computer for first data;
   in response to the backup request:
      encrypt the first data as one or more encrypted segments, each having an encrypted segment size; and
      convey the one or more encrypted segments to a remote server computer for storage on a storage medium; and
      receive a restore request from the client computer for second data which corresponds to a given encrypted segment of the first data, the second data having a size less than the encrypted segment size;
   in response to the restore request:
      request the remote server computer to transmit only a portion of the given encrypted segment, wherein the given encrypted segment has a beginning and an end, wherein the requested portion does not include one or more encrypted sub-segments at the end of the given encrypted segment.

14. The non-transitory computer-readable storage medium of claim 13, wherein the program instructions are further executable by the backup server computer to cause the backup server computer to:
  receive only the requested portion of the given encrypted segment; and
  decrypt the requested portion of the given encrypted segment, wherein said decrypting comprises utilizing an encrypted sub-segment immediately prior to a particular encrypted sub-segment to decrypt the particular encrypted sub-segment.

15. The non-transitory computer-readable storage medium of claim 14, wherein an algorithm used for encryption has a property of allowing a given encrypted sub-segment to be decrypted by utilizing an immediate prior encrypted sub-segment as a key.

* * * * *